(12) United States Patent
Kannengiesser

(10) Patent No.: US 12,377,599 B2
(45) Date of Patent: Aug. 5, 2025

(54) METHOD FOR HEATING A PREFORM AND CORRESPONDING METHOD FOR FORMING A CONTAINER

(71) Applicant: SOCIETE DES PRODUITS NESTLE S.A., Vevey (CH)

(72) Inventor: Damien Jean-Philippe Kannengiesser, Golbey (FR)

(73) Assignee: Societe des Produits Nestle S.A., Vevey (CH)

( * ) Notice: Subject to any disclaimer, the term of this patent is extended or adjusted under 35 U.S.C. 154(b) by 64 days.

(21) Appl. No.: 18/007,344

(22) PCT Filed: Jul. 30, 2021

(86) PCT No.: PCT/EP2021/071385
§ 371 (c)(1),
(2) Date: Jan. 30, 2023

(87) PCT Pub. No.: WO2022/029025
PCT Pub. Date: Feb. 10, 2022

(65) Prior Publication Data
US 2023/0278275 A1    Sep. 7, 2023

(30) Foreign Application Priority Data
Aug. 3, 2020    (EP) .................................... 20189147

(51) Int. Cl.
*B29C 49/64*    (2006.01)
*B29C 49/00*    (2006.01)
(Continued)

(52) U.S. Cl.
CPC ...... *B29C 49/6445* (2013.01); *B29C 49/0005* (2013.01); *B29C 49/071* (2022.05);
(Continued)

(58) Field of Classification Search
CPC ............ B29C 49/6435; B29C 49/6445; B29C 49/071; B29C 2949/0732;
(Continued)

(56) References Cited

U.S. PATENT DOCUMENTS 6,287,507 B1    9/2001    Appel et al.
8,728,601 B2 *  5/2014    Hutts ..................... B65D 35/08
                                                      428/542.8
(Continued)

FOREIGN PATENT DOCUMENTS

CH    707529 A1 *   7/2014    ............. B29C 49/12
EP    2253452       11/2010
(Continued)

OTHER PUBLICATIONS

Mechanical translation of WO-2008025328 A2 to Demarmels et al dated Mar. 2008. (Year: 2008).*
(Continued)

*Primary Examiner* — Galen H Hauth
*Assistant Examiner* — Baileigh Kate Darnell
(74) *Attorney, Agent, or Firm* — K&L Gates LLP

(57) ABSTRACT

Method for heating a preform (1) comprising: introducing the preform (1) into a heating apparatus (5) comprising an array of infrared emitters (50) arranged in multiple columns (Cj) and multiple rows (Ri), orienting angularly the preform at an input angular position by rotating the preform around the longitudinal axis; setting power levels of the infrared emitters (50) so as to divide the array of infrared emitters (50) into subsets of columns (SCn), each subset of columns (SCn) generating heat at a different power level from an adjacent subset of columns (SCn); and heating the preform (1) with the array of infrared emitters (50) while translating the preform (1) in a direction parallel to the rows (Ri) of the array at a translation speed, and simultaneously rotating said
(Continued)

preform (1) around its longitudinal axis (A1) in front of said infrared emitters (50) at a rotation speed.

12 Claims, 9 Drawing Sheets

(51) Int. Cl.
| | |
|---|---|
| *B29C 49/12* | (2006.01) |
| *B29C 49/02* | (2006.01) |
| *B29C 49/06* | (2006.01) |
| *B29K 23/00* | (2006.01) |
| *B29L 31/00* | (2006.01) |

(52) U.S. Cl.
CPC ........ *B29C 49/12* (2013.01); *B29C 2049/024* (2013.01); *B29C 49/06* (2013.01); *B29C 2949/0715* (2022.05); *B29C 2949/0732* (2022.05); *B29C 2949/0733* (2022.05); *B29C 2949/0745* (2022.05); *B29C 2949/0746* (2022.05); *B29C 2949/0747* (2022.05); *B29C 2949/0773* (2022.05); *B29K 2023/06* (2013.01); *B29K 2023/12* (2013.01); *B29L 2031/7158* (2013.01)

(58) Field of Classification Search
CPC .... B29C 2949/0746; B29C 2949/0747; B29C 2949/0733; B29C 2949/0745; B29C 49/0005
See application file for complete search history.

(56) References Cited

U.S. PATENT DOCUMENTS

| | | | |
|---|---|---|---|
| 10,556,371 | B2 | 2/2020 | Culeron et al. |
| 2010/0080944 | A1 | 4/2010 | Etesse |
| 2010/0127435 | A1 | 5/2010 | Feuilloley |
| 2011/0024954 | A1* | 2/2011 | Uradnisheck ....... B29C 49/0005 |
| | | | 264/566 |
| 2013/0193622 | A1 | 8/2013 | Feuilloley et al. |

FOREIGN PATENT DOCUMENTS

| | | | |
|---|---|---|---|
| GB | 2545065 | 6/2017 | |
| JP | H04299104 | 10/1992 | |
| WO | WO-2008025328 A2 * | 3/2008 | ......... B29C 49/0073 |
| WO | 2017155712 | 9/2017 | |

OTHER PUBLICATIONS

Gohil, "Properties and Strain Hardening Character of Polyethylene Terephthalate Containing Isosorbide", Polymer Engineering & Science, vol. 49, 2009, pp. 544-553, XP002572836.

European Office Action for Appl No. 21 752 057.6-1014 dated Apr. 7, 2025, 12 pages.

* cited by examiner

Fig. 6
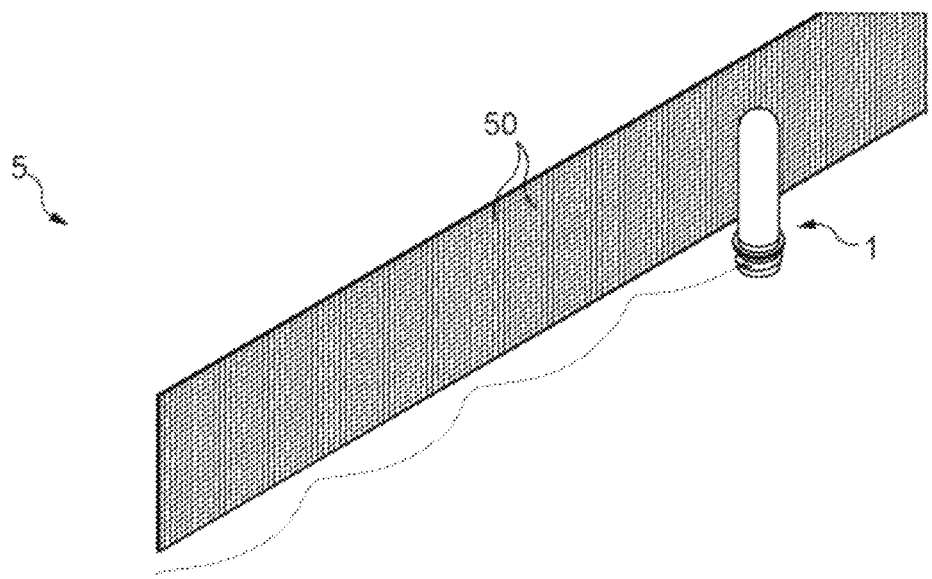
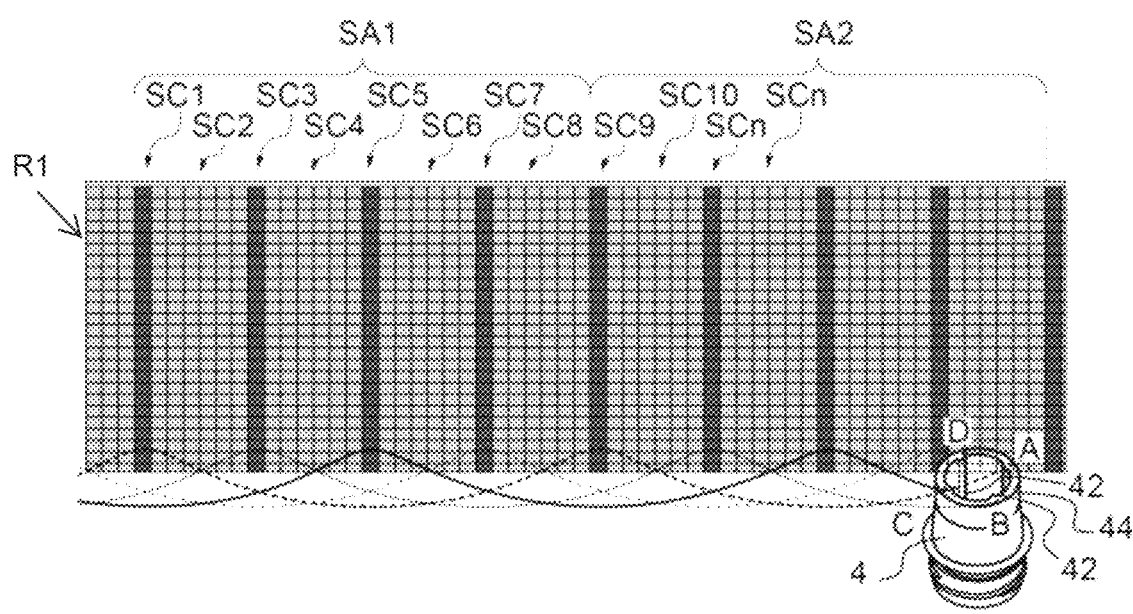
Fig. 7

Fig. 8
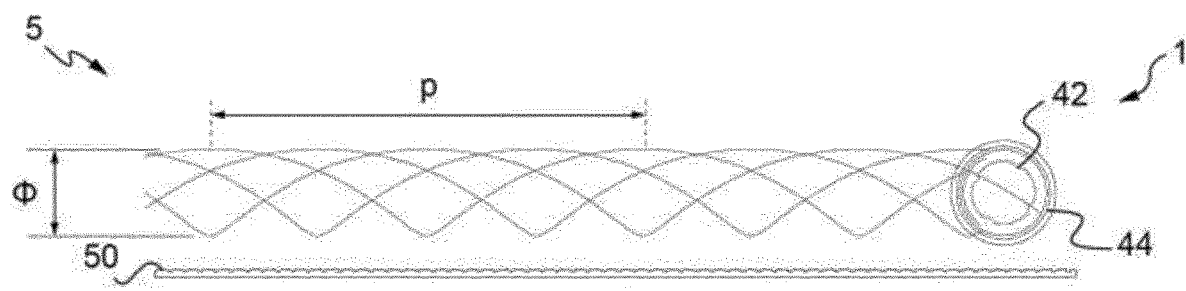
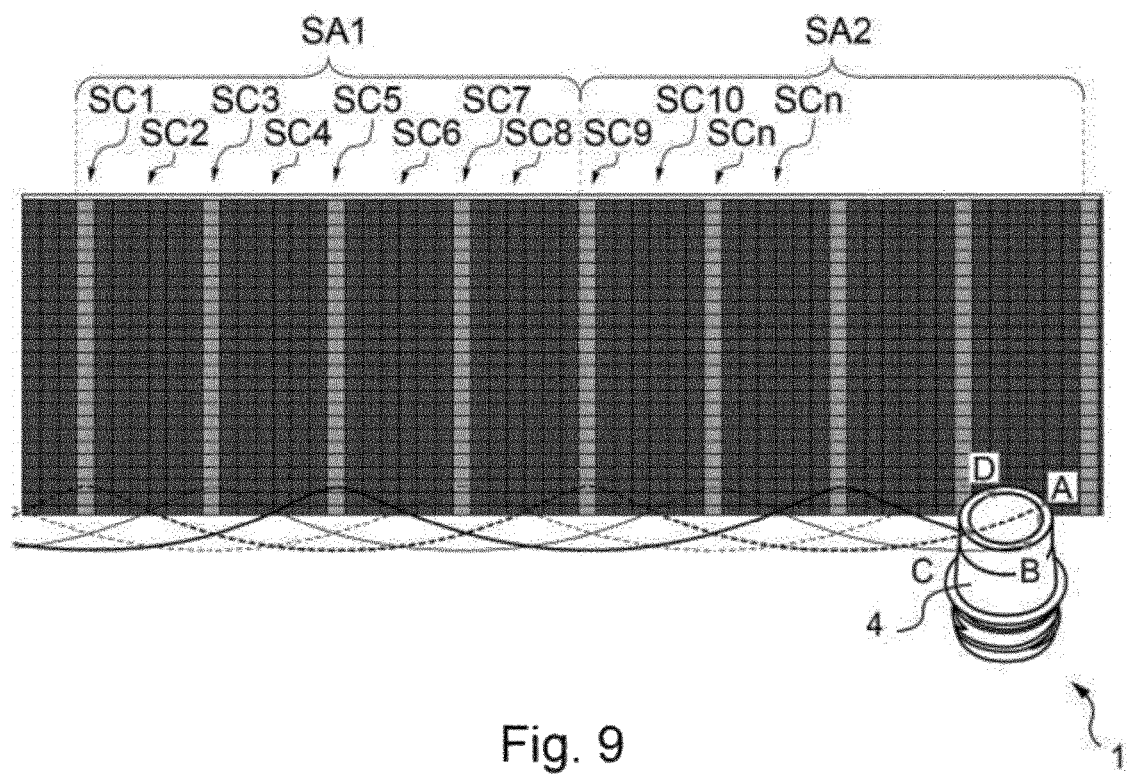
Fig. 9

METHOD FOR HEATING A PREFORM AND CORRESPONDING METHOD FOR FORMING A CONTAINER

CROSS REFERENCE TO RELATED APPLICATIONS

The present application is a National Stage of International Application No. PCT/EP2021/071385, filed on Jul. 30, 2021, which claims priority to European Patent Application No. 20189147.0, filed on Aug. 3, 2020, the entire contents of which are being incorporated herein by reference.

FIELD OF THE INVENTION

The present invention concerns a method for heating a preform and a heating apparatus configured to implement said method for heating.

BACKGROUND OF THE INVENTION

The bottles, used to store a product such as a liquid, that are commercially available are mainly manufactured starting from a preform to which a desired shape is given. The preform is a hollow element, generally having the shape of a test tube and made of a thermoplastic resin.

The bottles are usually manufactured by using a method comprising the following steps: injection, heating and stretch blow-moulding of a preform.

The first step of injection consists of injecting the thermoplastic resin in a mould such as to create the preform. Then, in the second step, the preform is heated at a temperature below their recrystallization point, usually using halogen lamps (as shown in FIG. 1a). Finally, in a third step, the bottle is created by blow-moulding the preform in a bottle-shaped mould 7.

One technique for performing the third step of blow-moulding comprises multiple sub-steps and is illustrated at FIG. 1b. First the preform 1 is stretched using a cylindrical rod 6. Then, air is blown at a low pressure; the preform 1 is thus pre-blown. A bubble 100 starts to form in the middle of the preform 1 and continues to get larger until a pre-bottle is formed. The pre-bottle is slightly smaller than the bottle-shaped mould 7. Finally, high pressure blown air is used to finish blowing the pre-bottle out against an inside wall of the bottle shaped-mould 7.

Most of the time, the thermoplastic resin that is used to manufacture the preform is PET Polyethylene terephthalate. PET presents the interesting mechanical property of strain hardening, also called work hardening.

Strain hardening of a material means that the latter becomes stiffer as it is stretched. In fact, when a force is applied to a material having such a property of strain hardening, said material first behaves like an elastic material. If stretching continues past the yield point, the material starts to stretch and becomes thinner, causing permanent deformation. If the material is stretched past its natural stretch ratio, the required force for additional stretching to occur is much higher than before having exceeded the natural stretch ratio.

Such a mechanical property is interesting when using the technique of blow-moulding as described above in which the preform is first stretched longitudinally by means of the rod then radially when blowing air in it. It enables, when the preform is correctly heated and blown, the manufacture of a bottle with a convenient thickness distribution.

However, it may be desirable to use other materials than PET and which have other interesting properties. For instance, it may be desirable to use a biodegradable material or a material having a lower density than that of PET in order to manufacture a light bottle.

However, such materials usually do not present the property of strain hardening as it is the case for PET. Thus prior art techniques for heating the preform and blowing air in it result in a bottle having weak mechanical properties and/or a non-uniform thickness. Non-uniform thickness shall mean that some areas of the bottle have a thickness different from others. In particular, the central part of the bottle can present a thickness which is thinner than that of the areas toward the base and shoulder region of the bottle.

The present invention aims at providing a solution to these drawbacks by enabling the manufacture of a bottle having a uniform thickness based on thermoplastic resins without strain hardening properties.

SUMMARY OF THE INVENTION

The invention concerns a method for heating a preform comprising an open neck portion at a first end, a closed base portion at a second end, and a body portion extending along a longitudinal axis between the neck portion and the base portion, said preform being made in a thermoplastic material having a density less than or equal to 1 $g/cm^3$.

According to the invention, said method comprises the following steps:

introducing the preform into a heating apparatus comprising an array of infrared emitters arranged in multiple columns and multiple rows, the preform and said array being disposed such that the longitudinal axis and the columns of the array of infrared emitters are parallel or directed obliquely with respect to each other;

orienting angularly the preform at an input angular position by rotating the preform around the longitudinal axis;

setting power levels of the infrared emitters so as to divide the array of infrared emitters into subsets of columns, each subset of columns generating heat at a different power level from an adjacent subset of columns; and heating the preform with the array of infrared emitters while translating the preform in a direction parallel to the rows of the array at a translation speed, and simultaneously rotating said preform around its longitudinal axis in front of said infrared emitters at a rotation speed, the rotation speed, the translation speed, the input angular position and the power levels of the infrared emitters being set so that the power levels of the subsets of columns facing at least three zones of the body portion extending longitudinally are different from the power levels of the subsets of columns facing the rest of the body portion, said zones of the body portion extending relative to one another in a polygonal array, the power levels of the subsets of columns facing said zones of the body portion being set higher than the power levels of the subsets of columns facing the rest of the body portion if and only if said zones of the body portion have a greater thickness than the thickness of the rest of the body portion.

Thanks to the layout of the infrared emitters in array with columns and rows, the preform can be heated at different power levels from one part of the body portion to another. In particular, the zones of the body portion extending relative to one another in a polygonal array can be heated at a different power level from the rest of the body portion of the preform.

By being able to control the power level of each infrared emitter, and setting accordingly the rotation speed, the translation speed and the power levels of the infrared emitters, it is thus possible starting from a preform with a body portion having an uneven thickness, in particular thicker at said longitudinal zones extending relative to one another in a polygonal array, to heat more said longitudinal zones. Providing thicker longitudinal zones and heating them more than the rest of the body portion, enable the reinforcement of the preform and guidance of its deformation when air is further blown inside of it.

Thanks to this method for heating, it is also possible, starting from a body portion having a homogeneous thickness along any transverse cross-section, to heat less at said longitudinal zones extending relative to one another in a polygonal array, than in the rest of the body portion. Heating less the longitudinal zones avoids weakening mechanically the preform and enables the guidance of its deformation when air is further blown inside of it.

Therefore, this method for heating provides the appropriate heating to said preform which will be further blow-moulded to manufacture a bottle. The preform correctly heated will be able to stretch as desired during blow-moulding. It is thus possible to manufacture a bottle with a homogeneous thickness starting from a preform made of a material having no strain hardening properties or low strain hardening properties.

It is intended by low strain hardening properties a material with his stress strain curve at a predefined temperature (T) having a tangent to his stress strain curve in the region of stretch ratio above 250%, this tangent having an equation in the form of $y=a*x+b$ with $a<0,03$ Mpa/% for T=110° C. or $a<0,05$ Mpa/% for T=90° C. The deformation is done at stain rate of 4/s. In other words it could be also be understood a material able to withstand less than 5 Mpa more at 350% stretch ratio than at 250% stretch ratio, while elongated under a stain rate of 16/s and at temperature between 90° C. and 130° C.

In one embodiment, the thermoplastic material of the preform presents a density less than or equal to 1 $g/cm^3$.

In one embodiment, the thermoplastic material is polypropylene, polyethylene.

Such materials presenting the advantage to have a low density compared to that of PET for example, enable the manufacture of lighter bottles. In particular, it enables these materials enable the manufacture of a bottle having a weight between 30% lower than a PET bottle.

In one embodiment, the thermoplastic material is biodegradable. For example, the thermoplastic material is polyhydroxyalkanoates.

In one embodiment, the number of columns for each subset of columns is determined according to the dimension of the emitters in the direction of the preform translation, the perimeter of the transverse cross-section of the body portion, the translation speed and the rotation speed.

It is thus possible to set these parameters to obtain the appropriate and desired heating of the preform. For example, the parameters can be set such that each point of the preform faces infrared emitters at the same power levels all along its trajectory in the heating apparatus.

In one embodiment, when setting the power levels of the heat generated by the infrared emitters, the array of infrared emitters is divided into sub-arrays, each sub-array comprising a number of subsets of columns equal to twice the number of said longitudinal zones of the body portion, the power levels of said subsets of columns being set by alternating between two different power levels from one subset of columns to an adjacent subset of columns.

This setting of the power levels of the infrared emitters enables for instance an appropriate heating for a preform, at different power level at said longitudinal zones extending relative to one another in a polygonal array than in the rest of the body portion.

Moreover, the temperature in the thicker zones is only slightly lower than in the rest of the body portion. In particular, the temperature in the thicker zones is about 2 to 10° C. lower than in the rest of the body portion.

In one embodiment, the power levels of the infrared emitters of all the sub-arrays are set similarly.

Thanks to this setting, each point of the preform faces subsets of columns generating heat at the same power levels all along its trajectory in the heating apparatus.

In one embodiment, the method is implemented for heating a preform having a body portion comprising at least three zones extending longitudinally and relative to one another in a polygonal array, said zones presenting a greater thickness than the rest of the body portion. The rotation speed, the translation speed, the input angular position and the power levels of the infrared emitters are set so that the power levels of the subsets of columns facing said zones of the body portion are higher than the power levels of the subsets of columns facing the rest of the body portion.

In one embodiment, the method is implemented for heating a preform comprising a body portion having a uniform thickness along any transverse cross-section. The rotation speed, the translation speed, the input angular position and the power levels of the infrared emitters are set so that the power levels of the subsets of columns facing said zones of the body portion extending longitudinally are different from the power levels of the subsets of columns facing the rest of the body portion, said zones of the body portion extending relative to one another in a polygonal array, the power levels of the subsets of columns facing said zones of the body portion being set lower than the power levels of the subsets of columns facing the rest of the body portion.

In one embodiment, the body portion comprises between three and ten zones extending longitudinally and relative to one another in a polygonal array.

The number of zones extending longitudinally depends of the dimensions and shape, as well as the material behaviour with respect to strain hardening, of the preform.

In a second aspect, the invention concerns a heating apparatus configured to implement the method for heating presenting the previous features. The heating apparatus comprises:
 an array of infrared emitters arranged in multiple columns and multiple rows; and
 means for holding, orienting the preform at said input angular position, translating along a direction parallel to the rows at a settable translation speed and simultaneously rotating said preform around its longitudinal axis in front of said infrared emitters at a settable rotation speed.

In a third aspect, the invention concerns a method for manufacturing a container, in particular a bottle, using a preform comprising an open neck portion at a first end, a closed base portion at a second end, and a body portion extending along a longitudinal axis between the neck portion and the base portion, said preform being made in a thermoplastic material having no strain hardening properties or low hardening. The method for manufacturing comprises the following steps:

heating the preform using the method for heating presenting the previous features;

transferring the heated preform into a container-shaped mould;

stretching the preform along the longitudinal axis by means of a longitudinal rod; and blow-moulding the preform by injecting air in two steps so as to make the heated preform stretch and take the shape of the container-shaped mould, the air being injected at a first pressure then at a second pressure higher than said first pressure.

This method provides a bottle presenting a homogeneous thickness starting from a preform made of a material which does not present strain hardening properties.

It shall be understood that a homogeneous thickness stands for a constant thickness or a substantially constant thickness, i.e. the variation in a transversal cross-section from one part to another of the bottle does not exceed 20%.

In a fourth aspect, the invention concerns a bottle manufactured by said method for manufacturing.

BRIEF DESCRIPTION OF THE DRAWINGS

Additional features and advantages of the present invention are described in, and will be apparent from, the description of the presently preferred embodiments which are set out below with reference to the drawings in which:

FIG. 6 represents a heating apparatus according to an embodiment of the invention and in which a preform is heated;

FIG. 7 the heating apparatus of FIG. 6 implementing a method for heating the preform of FIG. 2a, according to an embodiment of the invention;

FIG. 8 represents the heating apparatus of FIG. 6 along a cross-section plane; and FIG. 9 the heating apparatus of FIG. 6 implementing a method for heating a preform, according to another embodiment of the invention.

DETAILED DESCRIPTION OF THE INVENTION

Figure 1A:
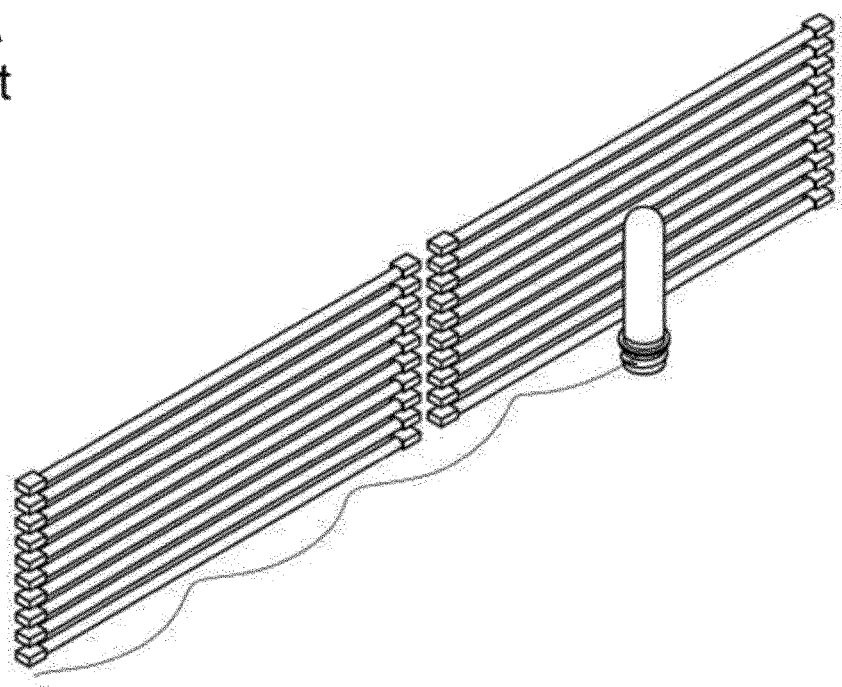
FIG. 1a represents a heating apparatus of the prior art in which a preform is heated.
Figure 2A:
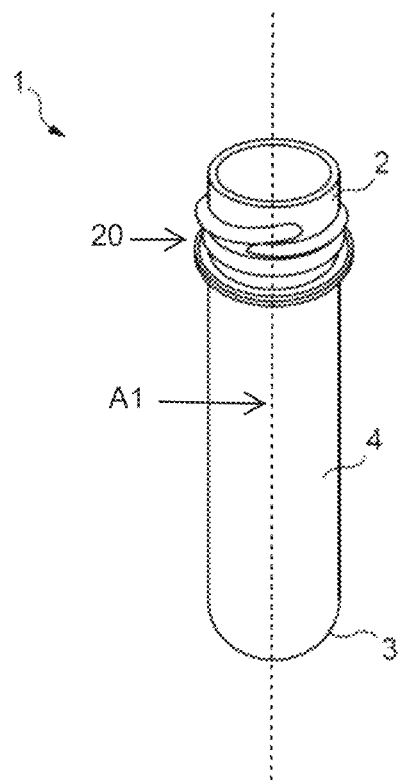
FIGS. 2a, 2b, 2c, 2d represent a preform used to obtain a bottle according to a first embodiment of the invention.

FIG. 2a represents an example of a preform 1 used to manufacture a bottle such as the one depicted at FIG. 1a. The bottle can be cylindrical or can have another shape such as a prismatic shape. The preform 1 is made of a thermoplastic material that does not present strain hardening properties.

For example, the material can be a light material having a low density. The material can have a density less than or equal to 1 g/cm³.

Examples of low density materials are polypropylene (PP) and polyethylene (PE). These materials enable the manufacture of light bottle and in the same time interesting mechanical properties such as The material can be biodegradable. For example, the material can be polyhydroxyalkanoates (PHA).

The preform 1 comprises a neck portion 2, a base portion 3 and a body portion 4. The body portion 4 extends between the neck portion 2 and the base portion 3, along a longitudinal axis A1. The preform 1 presents the shape of a test tube. The preform 1 has an inner surface 10 and an outer surface 11 (visible on FIGS. 2c-2d).

The neck portion 2 extends at an open first end 12 of the preform 1. The neck portion 2 has a substantially tubular shape.

The neck portion 2 comprises a threaded part 20. Once the bottle manufactured starting from the preform 1, the threaded part 20 is intended to cooperate with a threaded top able to close the bottle.

The base portion 3 extends at a closed second end 13 of the preform 1. The base portion 3 has a substantially hemispherical shape. The base portion 3 can present a different shape, such as a substantially conical shape, in other embodiments.

The body portion 4 comprises a wall having an inner surface 40 and an outer surface 41. The body portion 4 has here a tubular shape. The inner surface 40 and the outer surface 41 have thus a substantially circular cross-section.

Figure 2B:
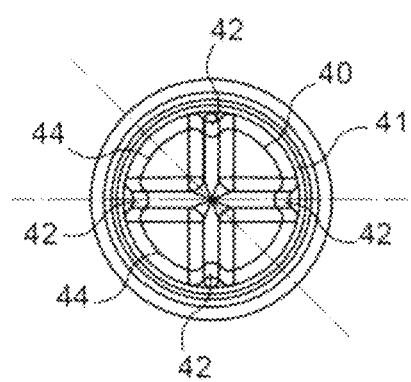
Figure 2C:
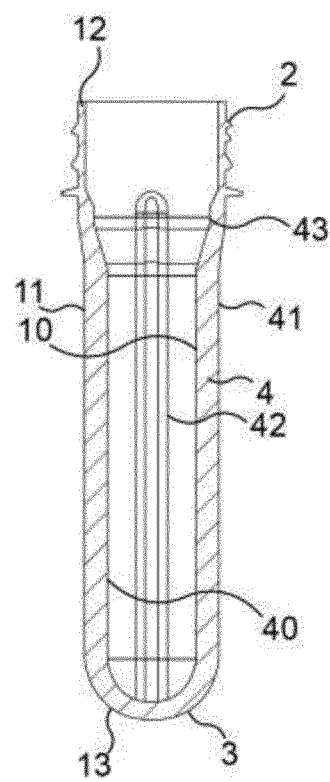
Figure 2D:
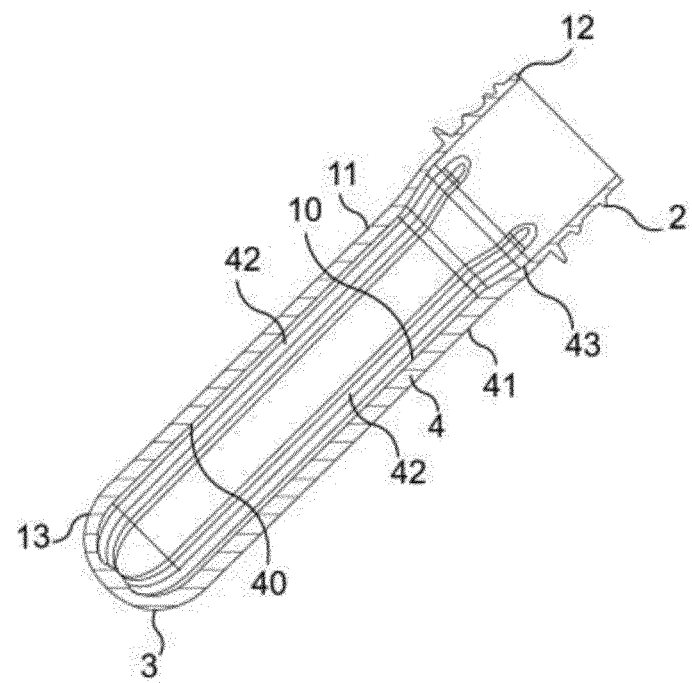

FIG. 2b is a transverse cross-section view of the preform 1 of FIG. 2a. FIGS. 2c, 2d represent longitudinal cross-section views taken respectively along lines A-A and B-B of FIG. 2b.

As it can be seen on these figures, the neck portion 2 and the base portion 3 have respectively a homogeneous thickness. In other words, the dimension taken between an inner surface and an outer surface respectively of the neck portion 2 and the base portion 3 is constant across any transverse cross-section.

In the particular illustrated example, the inner surface 40 and the outer surface 41 of the body portion 4 have coaxial longitudinal axis which coincide with the longitudinal axis A1 of the preform 1.

The body portion 4 comprises four zones 42 of additional thickness. The four zones 42 extend longitudinally and relative to one another in a rectangular array. Rectangular array shall mean that the four zones 42 extend at 90° relative to one another around the preform longitudinal axis A1.

The four zones 42 are here projected zones of the inner surface 40. The four zones 42 present the shape of longitudinal bumps. The four zones 42 of additional thickness extend here from a first end 43 adjacent to the neck portion 2, to the base portion 3.

The thickness of the body portion 4 varies transversally, or along transverse-cross sections. As visible on FIG. 2b, the thickness of the body portion 4 is higher at the four zones 42 than in the rest of the body portion 4. The four zones 42 present here the same thickness.

The rest of the body portion 4 also has the same thickness which is thinner than that of the four zones 42. The rest of the body portion 4 shall be understood as referring to intermediate zones 44 extending between the four zones 42 of additional thickness. The body portion 4 comprises thus four intermediate zones 44.

The thickness of the body portion 4 varies here substantially similarly along any transverse cross-section. Of course, in another embodiment, the thickness of the body portion can vary differently from a transverse cross-section to another.

Figure 3A:
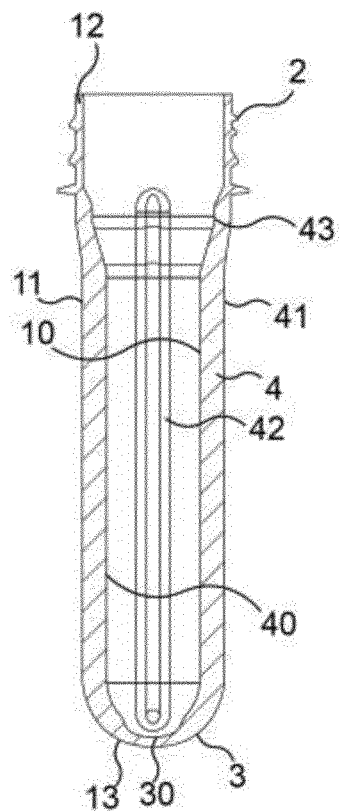
FIGS. 3a, 3b represent a preform used to obtain a bottle according to a second embodiment of the invention.
Figure 3B:
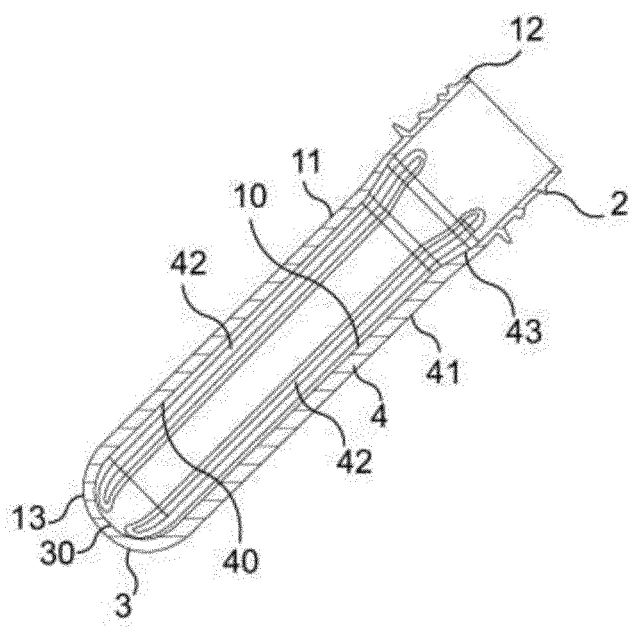

In another embodiment represented at FIGS. 3a, 3b, the four zones 42 of additional thickness do not extend until the base portion 3. Indeed, a space is kept between a bottom 30 of the preform 1 located at the base portion 3 and the four zones 42.

Figure 4A:
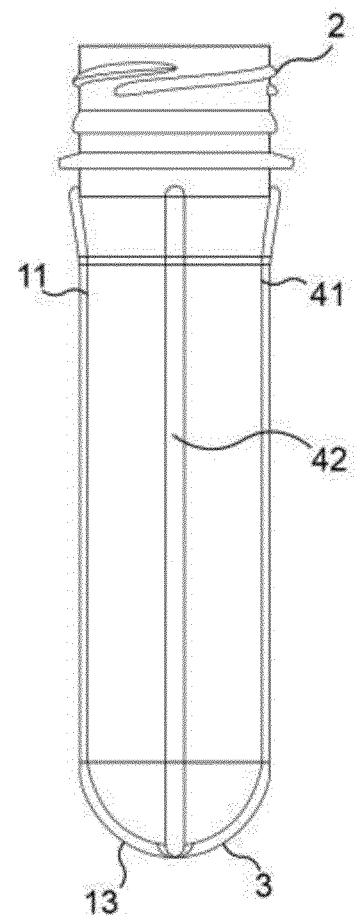
FIGS. 4a, 4b, 4c represent a preform used to obtain a bottle according to a third embodiment of the invention.
Figure 4B:
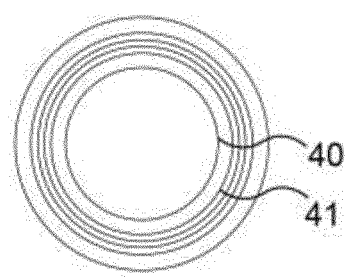
Figure 4C:
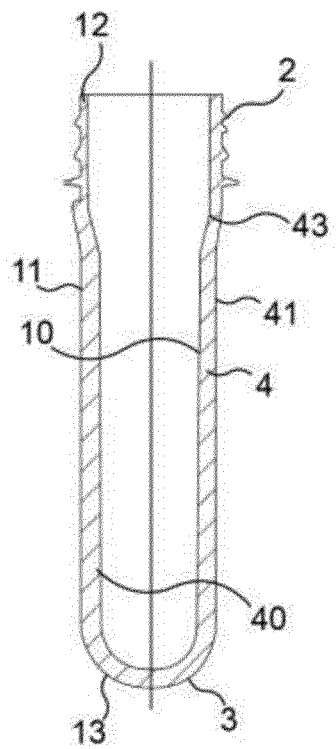
Figure 5A:
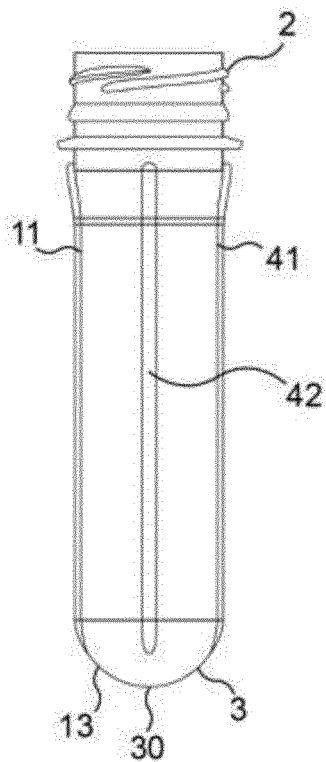
FIGS. 5a, 5b, 5c represent a preform used to obtain a bottle according to a fourth embodiment of the invention.
Figure 5B:
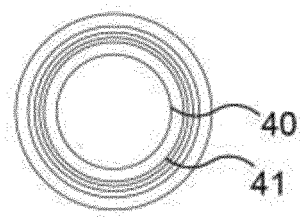
Figure 5C:
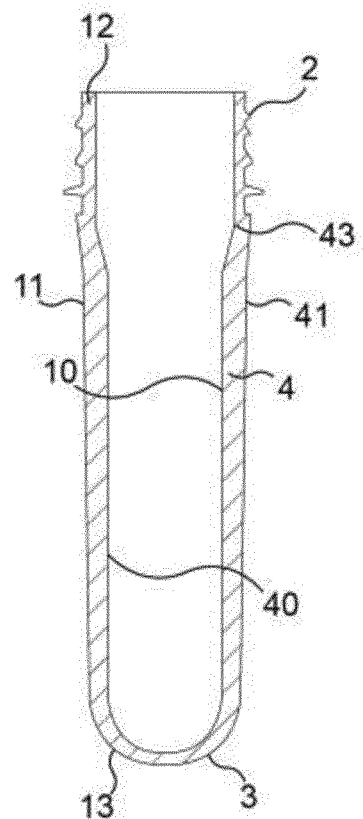

In two other embodiments represented at FIGS. 4a-4c, and 5a-5c, the four zones 42 are projected zones of the outer surface 41. In the embodiment of FIGS. 4a-4c, the four zones 42 extend longitudinally until the bottom 30 of the preform 1 located at the base portion 3. In the embodiment of FIGS. 5a-5c, a space is kept between the bottom 30 of the preform 1 located at the base portion 3 and the four zones 42.

Of course, and as it will be also explained further, the number of longitudinal zones 42 and their shape can vary depending of the dimensions and shape of the preform. The number of longitudinal zones 42 is preferably at least equal to three. Preferably, the number of longitudinal zones 42 ranges between three and ten.

FIG. 6 represents a heating apparatus 5 according to an embodiment of the invention and in which a preform 1 is heated.

The heating apparatus 5 comprises several infrared emitters 50 arranged in a matrix layout. In other words, the heating apparatus comprises an array of infrared emitters 50 arranged in multiple rows Ri and multiple columns Cj, with i and j a whole number at least equal to one.

Each infrared emitter 50 can emit heat at a settable power level. The heating apparatus thus comprises setting means (not represented) which enable setting of the power levels of the heat emitted by each infrared emitter 50.

The heating apparatus 5 further comprises means for holding, translating along a direction parallel to the rows Ri at a settable translation speed, and simultaneously rotating the preform 1 around its longitudinal axis A1 in front of the infrared emitters 50 at a settable rotation speed. These means are not represented either.

An example of the trajectory of a point of the outer surface 10 of the preform 1 is illustrated. Of course, as will be understood along with the description of the method for heating the preform 1, this trajectory varies according to the dimensions of the preform 1 and in particular the diameter of the outer surface 41 of the body portion 4, the translation speed and the rotation speed.

Thanks to the matrix layout of the infrared emitters 50, the preform 1 can pass in front of several infrared emitters 50 while making a single revolution. This makes possible the use of different power levels from one column Cj to another.

FIG. 7 represents the heating apparatus 5 of FIG. 6 implementing a method for heating the preform 1 according to an embodiment of the invention. In particular, the method for heating is applied to the preform 1 comprising four zones 42 of additional thickness of FIG. 2a-2d.

The power levels of the infrared emitters 50 are set such that to divide the array of infrared emitters into subsets of columns SCn (n being a whole number at least to one).

In this document, a power level of a subset of columns shall be understood as the sum of power levels of all the infrared emitters 50. Two subsets of columns generating the same power level have their respective infrared emitters generating the same power levels. Two subsets of columns generating the same power level are thus similarly set.

In the illustrated embodiment, all the infrared emitters 50 of the same subset of columns SCn generate heat at the same power level. Thus, all the rows Ri of the same subset of columns SCn generate heat at the same power level. Of course, in another embodiment, not only the power levels of the columns Cj but also the power levels of the rows Ri can vary.

Each subset of columns SCn generates heat at a different power level from an adjacent subset of columns. A subset of columns SCn can comprise one or several columns Cj.

The number of columns Cj for each subset of columns SCn is determined according to the perimeter of the transverse cross-section of the body portion 4, the translation speed and the rotation speed of the preform 1.

In this embodiment, when setting the power levels of the heat generated by the infrared emitters 50, the array of infrared emitters 50 is divided into sub-arrays SAk (k being a whole number at least equal to one). All the sub-arrays SAk comprise for example the same number of columns Cj and rows Ri of infrared emitters 50. In this figure, two sub-arrays SA1, SA2 are represented.

Each sub-array SAk comprises here eight subsets of columns. The subset of columns are thus referenced SCn with i varying here from 1 to 8, and distinguished with shades of grey.

The number of sub-arrays SAk depends on the number of zones 42 of the body portion 4. In particular, each sub-array SAk comprising a number of subsets of columns SCn equal to twice the number of said longitudinal zones 42 of the body portion.

The darker the subset of columns SCn, the highest its power level is, and vice versa. In particular, four subsets of columns, here referenced SC1, SC3, SC5, SC7, are set at a particular power level, and four other subsets of columns, here referenced SC2, SC4, SC6, SC8, are set at a power level lower than said particular power level. In other words, half of the subsets of columns is set at a power level, and the other half of the subsets of columns is set at a different power level, each subset of columns generating heat at a different power level from an adjacent subset of columns.

Each subset of columns generating heat at the highest power level, i.e. SC1, SC3, SC5, SC7 represented in the figure in a dark grey, comprises here one column. Each subset of columns generating heat at the lowest power level, i.e. SC2, SC4, SC6, SC8 represented in the figure in a light grey, comprises here six columns.

The preform 1 is introduced into the heating apparatus 5 and oriented prior to enter the heating apparatus 5 for example by a mechanical block or any appropriate device. The preform 1 is oriented towards the holding means of the heating apparatus 5.

The preform 1 and the array of emitters 50 are disposed such that the longitudinal axis A1 and the columns Cj are parallel or directed obliquely with respect to each other. The longitudinal axis A1 of the preform 1 is thus orthogonal to the rows Ri of the array of emitters 50.

Preferably, the preform 1 is introduced and oriented such that the longitudinal axis A1 extends vertically. The array of emitters 50 is either placed vertically or inclined with respect to the vertical direction. In other words, the columns Cj extend either vertically or inclined with respect to the vertical direction.

Therefore, the preform 1 and the array of emitters 50 are disposed with respect to each other such that the distance between the emitters 50 and the outer surface 11 of the preform 1 facing the emitters 50 is substantially constant at any point of said outer surface 11.

The longitudinal axis A1 and the columns Cj form a projection angle between 0° and 45°, and preferably here between 0° and 25°.

In the particular illustrated examples, the longitudinal axis A1 of the preform 1 is parallel to the columns Cj.

The preform 1 is then angularly oriented at an input angular position on the holding means. The preform 1 is angularly oriented such that one of the longitudinal zones 42 of the body portion 4 faces the subset of columns having the highest power level, for instance SC1 here.

The preform 1 is heated with the array of infrared emitters 50 while translating the preform 1 along a direction parallel to the rows Ri of the array at a certain translation speed, and simultaneously rotating the preform 1 around its longitudinal axis A1 in front of the infrared emitters 50 at a certain rotation speed.

The means for orienting the preform 1 at the input angular position and rotating it around the longitudinal axis A1 along the preform's trajectory in the heating apparatus can be one same apparatus or distinct ones.

In this embodiment, the rotation speed, the input angular position, the translation speed and the power levels of the infrared emitters 50 are set so that the heat generated by the subsets of columns SCn facing thicker zones of the body portion 4 is higher than the heat generated by the subsets of columns SCn facing thinner zones of the body portion 4.

In other words, the power levels of the infrared emitters 50 are set so that the heat generated by the subsets of columns SCn facing the four zones 42 of additional thickness of the body portion 4 is higher than the heat generated by the subsets of columns SCn facing the rest of the body portion 4.

In the represented embodiment, for each sub-array SAk, the subsets of columns SC1, SC3, SC5, SC7 generating heat at the highest power level, face the four zones 42 of additional thickness of the body portion 4. In particular, each of the four subsets of columns SC1, SC3, SC5, SC7 faces one different zone of the four zones 42 during the progress of the preform 1 in the heating apparatus 5.

To illustrate this, four cycloids are represented at FIG. 7, and which correspond to the trajectories of four points A, B, C, D of the outer surface 41 of the body portion 4. Each of the four points A, B, C, D belongs to one of the four zones 42 of additional thickness of the body portion 4.

The cycloids of FIG. 7 show thus that points A, B, C, D face all along their trajectory in the heating apparatus the subsets of columns SC1, SC3, SC5, SC7, i.e. the subsets of columns generating heat at the highest power level. In particular, point A faces the subsets of columns SC1, point B faces the subsets of columns SC3, point C faces the subsets of columns SC5, and point D faces the subsets of columns SC7.

The zones of the body portion 4 other than the four zones 42 of additional thickness face all along their trajectory in the heating apparatus 5 the subsets of columns SC2, SC4, SC6, SC8. In other words, the intermediate zones 44 of the body portion 4 face all along their trajectory in the heating apparatus 5 the subsets of columns generating heat at the lowest power level.

The preform 1 is thus being heated in front of the infrared emitters 50 while making only one revolution from one sub-array SAk to another. Therefore in this embodiment, this enables creating a quasi-homogeneous temperature on the circumference of the preform 1 despite the variation of the thickness. The temperature in the zones 42 of additional thickness is only slightly lower than in the rest of the body portion. In particular, the temperature in the zones 42 of additional thickness is about 2 to 10° C. lower than in the rest of the body portion.

Of course, this is applicable to any number of zones 42 of additional thickness of the body portion 4. In other words, if the number of zones 42 of additional thickness of the body portion 4 is different, the heating using the infrared emitters 50 can be changed accordingly. Thus, the heat generated by the subsets of columns SCn facing the zones 42 of additional thickness of the body portion 4 is higher than the heat generated by the subsets of columns SCn facing the rest of the body portion 4.

FIG. 8 is a cross-section of the heating apparatus 5 of FIG. 6 in a plane parallel to the plane in which the preform moves. Three different cycloids are represented. The amplitude $\phi$ of the cycloids corresponds to the outer diameter of the body portion 4, i.e. the diameter of the outer surface 41 of the body portion 4. The period p of the cycloids depends on the rotation speed and the translation speed of the preform 1.

Of course, the power levels of the subsets of columns can be set in a different manner is determined depending on the thickness variation of the body portion, the perimeter of the transverse cross-section of the body portion 4, the translation speed and the rotation speed.

FIG. 9 represents the heating apparatus 5 of FIG. 6 implementing a method for heating the preform 1 according to another embodiment of the invention. In particular, the method for heating is applied to the preform 1 comprising a body portion 4 having a uniform or homogeneous thickness along any transverse cross-section.

The embodiment of this figure differs from that of FIG. 7 in the setting of the infrared emitters 50.

The rotation speed, the translation speed, the input angular position and the power levels of the infrared emitters 50 are set so that the heat generated by the subsets of columns SCn facing four zones 42 of the body portion 4 extending longitudinally and respective one another in a rectangular array is different from the heat generated by the subsets of columns facing the rest of the body portion. In particular, the power levels of the infrared emitters 50 are set so that the heat generated by the subsets of columns SCn facing the four zones 42 of the body portion is lower than the heat generated by the subsets of columns SCn facing the rest of the body portion 4.

The four zones 42 present here the same thickness as the rest of the body portion 4.

In the represented embodiment, for each sub-array SAk, the subsets of columns SC1, SC3, SC5, SC7 generating heat at the lowest power level, face the four zones 42 of the body portion 4. In particular, each of the four subsets of columns SC1, SC3, SC5, SC7 faces one different zone of said four zones during the progress of the preform 1 in the heating apparatus 5.

Each subset of columns generating heat at the lowest power level, represented in the figure in a light grey, comprises one column.

Four cycloids are represented at FIG. 9, and which correspond to the trajectories of four points A, B, C, D of the outer surface 41 of the body portion 4. Each of the four points A, B, C, D belongs to one of the four zones 42 of the body portion 4.

The cycloids of FIG. 7 show thus that points A, B, C, D face all along their trajectory in the heating apparatus the subsets of columns SC1, SC3, SC5, SC7, i.e. the subsets of columns generating heat at the lowest power level. In particular, point A faces the subsets of columns SC1, point B faces the subsets of columns SC3, point C faces the subsets of columns SC5, and point D faces the subsets of columns SC7.

The zones of the body portion 4 other than the four zones face all along their trajectory in the heating apparatus 5 the subsets of columns SC2, SC4, SC6, SC8. In other words, the zones of rest of the body portion 4 face all along their trajectory in the heating apparatus the subsets of columns generating heat at the highest power level.

It will be noticed that this setting of the power levels of the infrared emitters 50 is the exact opposite of the setting made in the embodiment of FIG. 7.

Similarly, to the embodiment of FIG. 7, the preform 1 is thus being heated in front of the infrared emitters 50 while making only one revolution from one sub-array SAk to another.

Of course, this is applicable to any number of zones 42 of the body portion 4 depending on the dimensions and shape of the preform. Depending on the number of zones 42, the heating using the infrared emitters 50 can be changed accordingly. Thus, the heat generated by the subsets of columns SCn facing the zones 42 of the body portion 4 is lower than the heat generated by the subsets of columns SCn facing the rest of the body portion 4.

Figure 1B:
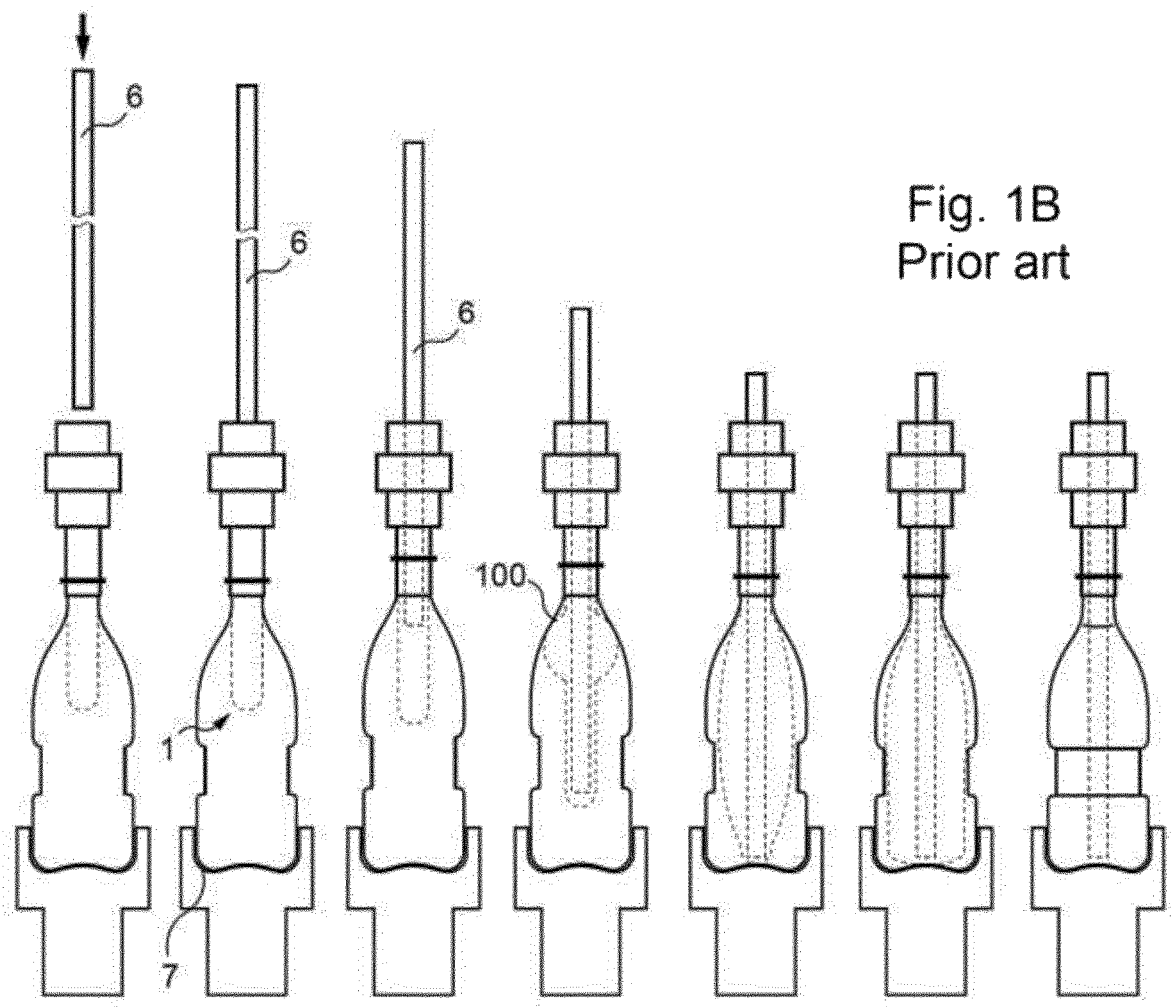
FIG. 1b represents steps of a technique of blow-moulding a preform known in the prior art.

The method for manufacturing a bottle comprises a first step heating the preform 1 using the described method for heating. Then in a second step, the heated preform 1 is blow-moulded in a bottle-shaped mould, by injecting air so as to make the heated preform 1 stretch and take the shape of the mould. The blow-moulding process is preferably the one illustrated at FIG. 1b and described above in relation with this figure.

The heating method as described below enables the control of the deformation of the preform during blow-moulding, even though the thermoplastic material of the preform does not have strain hardening properties. In other words, the appropriate heating of the preform 1 replaces the strain hardening properties.

By designing and heating correctly the preform 1, it is possible to guide the deformation of the preform and in particular of the bubble form during the blow-moulding, and to strengthen the thermoplastic material.

In fact, the longitudinal zones 42 extend parallel to rod 6 that stretches the preform 1 longitudinally during blow-moulding, the zones 42 act as a guide for the deformation of the preform 1.

Moreover, by providing zones of additional thickness 42 in the embodiments of FIGS. 2a to 5c, it is possible to strengthen locally the preform 1. The weight of the manufactured bottle is maintained to a reasonable value.

In the embodiment described in relation with FIG. 9 and in which the thickness of the body portion 4 is uniform, heating less the longitudinal zones 42 provides them with a higher mechanical strength.

The preform 1 needs to be designed correctly based on the dimensions of the desired bottle and the stretching characteristics of the thermoplastic material. The stretch ratios between the bottle and the preform are thus calculated. Depending on these ratios, the temperature of heating of the preform for each zones of the body portion is set.

Since the preform 1 is stretch longitudinally with the rod 6 and radially with air pressure, longitudinal stretch ratio (also called axial stretch ratio) and radial stretch ratio (also called hoop stretch ratio) should be taken into account.

The invention thus proposes a solution for manufacturing a bottle having a homogeneous thickness starting from a preform made of a material which does not have strain hardening properties, and either with a body portion having an uneven thickness or with a body portion having a homogeneous thickness.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A method for heating a preform comprising an open neck portion at a first end, a closed base portion at a second end, and a body portion extending along a longitudinal axis between the neck portion and the base portion, the preform being made in a thermoplastic material configured to withstand less than 5 Mpa at a stretch ratio above 250% while elongated under a strain rate of 16/s, the method comprising the following steps:
   introducing the preform into a heating apparatus comprising an array of infrared emitters arranged in a plurality of columns and a plurality of rows, the preform and the array of infrared emitters being disposed such that the longitudinal axis and the plurality of columns of the array of infrared emitters are parallel or directed obliquely with respect to each other;
   orienting angularly the preform at an input angular position by rotating the preform around the longitudinal axis;
   setting power levels of the array of infrared emitters so as to divide the array of infrared emitters into subsets of the plurality of columns, each subset of the plurality of columns generating heat at a different power level from an adjacent subset of columns;
   heating the preform with the array of infrared emitters while translating the preform in a direction parallel to the plurality of rows of the array of infrared emitters at a translation speed, and simultaneously rotating the preform around its longitudinal axis in front of the array of infrared emitters at a rotation speed,
   the rotation speed, the translation speed, the input angular position and the power levels of the infrared emitters being set so that the power levels of the subsets of the plurality of columns facing at least three zones of the body portion extending longitudinally are different from the power levels of the subsets of the plurality of columns facing the rest of the body portion, the zones of the body portion extending relative to one another in a polygonal array, the power levels of the subsets of columns facing the zones of the body portion being set higher than the power levels of the subsets of columns facing the rest of the body portion if and only if the zones of the body portion have a greater thickness than the thickness of the rest of the body portion.

2. The method for heating according to claim 1, wherein the thermoplastic material of the preform presents a density less than or equal to 1 g/cm$^3$ s.

3. The method for heating according to claim 1, wherein the thermoplastic material is polypropylene, polyethylene.

4. The method for heating according to claim 1, wherein the thermoplastic material is biodegradable.

5. The method for heating according to claim 4, wherein the thermoplastic material is polyhydroxyalkanoates.

6. The method for heating according to claim 1, wherein the number of columns for each subset of the plurality of columns is determined according to the dimension of the emitters in the direction of the preform translation, the perimeter of the transverse cross-section of the body portion, the translation speed and the rotation speed.

7. The method for heating according to claim 1, wherein when setting the power levels of the heat generated by the infrared emitters, the array of infrared emitters is divided into sub-arrays, each sub-arrays comprising a number of subsets of the plurality of columns equal to twice the number of the longitudinal zones of the body portion, the power levels of the subsets of columns being set by alternating between two different power levels from one subset of the plurality of columns to an adjacent subset of the plurality of columns.

8. The method for heating according to claim 7, wherein the power levels of the infrared emitters of all the sub-arrays are set similarly.

9. The method for heating a preform according to claim 1, wherein the body portion comprising at least three zones extending longitudinally and relative to one another in a polygonal array, the zones presenting a greater thickness than the rest of the body portion, wherein the rotation speed, the translation speed, the input angular position and the power levels of the infrared emitters are set so that the power levels of the subsets of columns facing the zones of the body portion are higher than the power levels of the subsets of columns facing the rest of the body portion.

10. The method for heating a preform according to claim 1, wherein the body portion having a uniform thickness along any transverse cross-section, wherein the rotation speed, the translation speed, the input angular position and the power levels of the infrared emitters are set so that the power levels of the subsets of the plurality of columns facing the zones of the body portion extending longitudinally are different from the power levels of the subsets of columns facing the rest of the body portion, the zones of the body portion extending relative to one another in a polygonal array, the power levels of the subsets of the plurality of columns facing the zones of the body portion being set lower than the power levels of the subsets of columns facing the rest of the body portion.

11. The method for heating a preform according to claim 1, wherein the body portion comprises between three and ten zones extending longitudinally and relative to one another in a polygonal array.

12. A method for manufacturing a container, using a preform comprising an open neck portion at a first end, a closed base portion at a second end, and a body portion extending along a longitudinal axis between the neck portion and the base portion, the preform being made in a thermoplastic material configured to withstand less than 5 Mpa at a stretch ratio above 250% while elongated under a strain rate of 16/s, the method for manufacturing comprising the following steps:

heating the preform comprising an open neck portion at a first end, a closed base portion at a second end, and a body portion extending along a longitudinal axis between the neck portion and the base portion, the preform being made in a thermoplastic material having no strain hardening properties or low strain hardening properties, the method comprising the following steps:

introducing the preform into a heating apparatus comprising an array of infrared emitters arranged in a plurality of columns and a plurality of rows, the preform and the array of infrared emitters being disposed such that the longitudinal axis and the columns of the array of infrared emitters are parallel or directed obliquely with respect to each other;

orienting angularly the preform at an input angular position by rotating the preform around the longitudinal axis;

setting power levels of the array of infrared emitters so as to divide the array of infrared emitters into subsets of the plurality of columns, each subset of the plurality of columns generating heat at a different power level from an adjacent subset of the plurality of columns;

heating the preform with the array of infrared emitters while translating the preform in a direction parallel to the rows of the array of infrared emitters at a translation speed, and simultaneously rotating the preform around its longitudinal axis in front of the array of infrared emitters at a rotation speed, the rotation speed, the translation speed, the input angular position and the power levels of the array of infrared emitters being set so that the power levels of the subsets of the plurality of columns facing at least three zones of the body portion extending longitudinally are different from the power levels of the subsets of the plurality of columns facing the rest of the body portion, the zones of the body portion extending relative to one another in a polygonal array, the power levels of the subsets of columns facing the zones of the body portion being set higher than the power levels of the subsets of the plurality of columns facing the rest of the body portion if and only if the zones of the body portion have a greater thickness than the thickness of the rest of the body portion;

transferring the heated preform into a container-shaped mold;

stretching the preform along the longitudinal axis by means of a longitudinal rod; and blow-molding the preform by injecting air in two steps so as to make the heated preform stretch and take the shape of the container-shaped mold, the air being injected at a first pressure then at a second pressure higher than the first pressure.

* * * * *